US012291437B2

(12) United States Patent
Woldring et al.

(10) Patent No.: US 12,291,437 B2
(45) Date of Patent: May 6, 2025

(54) EXTENDABLE LATTICE TYPE CRANE BOOM, AND METHOD FOR OPERATING A CRANE INCLUDING AN EXTENDABLE BOOM

(71) Applicant: GustoMSC B.V., Schiedam (NL)

(72) Inventors: Wilhelmus Coenradus Johannes Jozephus Woldring, Rotterdam (NL); Mark Cornelius Marinus Franciscus Rommens, Maassluis (NL)

(73) Assignee: GustoMSC B.V., Schiedam (NL)

( * ) Notice: Subject to any disclaimer, the term of this patent is extended or adjusted under 35 U.S.C. 154(b) by 0 days.

(21) Appl. No.: 17/708,124

(22) PCT Filed: Nov. 9, 2020

(86) PCT No.: PCT/NL2020/050703

§ 371 (c)(1),
(2) Date: Mar. 30, 2022

(87) PCT Pub. No.: WO2021/091389

PCT Pub. Date: May 14, 2021

(65) Prior Publication Data

US 2024/0109758 A1 Apr. 4, 2024

(30) Foreign Application Priority Data

Nov. 8, 2019 (NL) ..................................... 2024203

(51) Int. Cl.
*B66C 23/70* (2006.01)

(52) U.S. Cl.
CPC .................................. *B66C 23/707* (2013.01)

(58) Field of Classification Search
CPC ... B66C 23/707; B66C 23/701; B66C 23/703; B66C 23/708
See application file for complete search history.

(56) References Cited

U.S. PATENT DOCUMENTS

| | | | |
|---|---|---|---|
| 1,161,680 | A | 11/1915 | Hulett et al. |
| 2,819,803 | A | 1/1958 | Obenchain |

(Continued)

FOREIGN PATENT DOCUMENTS

| | | | |
|---|---|---|---|
| CN | 109982958 | A | 7/2019 |
| CN | 209276043 | U | 8/2019 |

(Continued)

OTHER PUBLICATIONS

International Search Report and Written Opinion—PCT/NL2020/050703—mailling date Mar. 3, 2021.

*Primary Examiner* — Emmanuel M Marcelo
*Assistant Examiner* — Juan J Campos, Jr.
(74) *Attorney, Agent, or Firm* — Banner & Witcoff, Ltd.

(57) ABSTRACT

Extendable lattice type crane boom (2) for a crane (1), the boom comprising a lattice type base boom section (**2*a*) and at least one lattice type telescopic boom section (2*b*), wherein the at least one telescopic boom section is adjustable with respect to the base boom section between a retracted position, in which the telescopic boom section is substantially inside of the base boom section, and an extended position, in which the telescopic boom section is at least partly outside of the base boom section, wherein a distal end of the base boom section to which a first guiding system (21) is mounted, the guiding system being configured to guide a movement of the telescopic boom section along the base boom section; wherein a proximal end of the telescopic boom section comprises a second guiding system (30**) configured to guide a movement of the telescopic boom section along the base boom section.

25 Claims, 7 Drawing Sheets

(56) References Cited

U.S. PATENT DOCUMENTS

| | | | | |
|---|---|---|---|---|
| 3,830,376 | A * | 8/1974 | Fritsch | B66C 23/702<br>212/350 |
| 3,931,698 | A * | 1/1976 | Ebersold | B66C 23/707<br>52/118 |
| 4,045,936 | A | 9/1977 | Sterner | |
| 4,053,058 | A * | 10/1977 | Jensen | B66C 23/708<br>212/298 |
| 4,257,201 | A * | 3/1981 | Landolt | B66C 23/707<br>212/230 |
| 4,337,601 | A | 7/1982 | Vaerk et al. | |
| 2010/0294735 | A1 | 11/2010 | Walker et al. | |
| 2012/0090261 | A1 | 4/2012 | Anderson | |
| 2013/0216343 | A1 | 8/2013 | Johannes | |
| 2019/0218075 | A1* | 7/2019 | Woldring | B66C 23/707 |

FOREIGN PATENT DOCUMENTS

| | | | |
|---|---|---|---|
| JP | 51145173 | U | 11/1976 |
| JP | S63119590 | U | 8/1988 |
| WO | 2018052283 | A1 | 3/2018 |

* cited by examiner

EXTENDABLE LATTICE TYPE CRANE BOOM, AND METHOD FOR OPERATING A CRANE INCLUDING AN EXTENDABLE BOOM

CROSS-REFERENCE TO RELATED APPLICATIONS

This application is a U.S. National Stage application under 35 U.S.C. § 371 of International Application PCT/NL2020/050703 (published as WO 2021/091389 A1), filed Nov. 9, 2020, which claims the benefit of priority to Application NL 2024203, filed Nov. 8, 2019. Benefit of the filing date of these prior applications is hereby claimed. Each of these prior applications is hereby incorporated by reference in its entirety.

The invention relates to an extendable lattice type boom for a crane. In many fields of construction and maintenance there is a demand for ever larger cranes capable of hoisting loads to increasing heights. This requires the use of a longer boom, or an extension attached to a boom, such as a jib. Increasing the length of the boom will inevitably introduce a hindrance for transportation of the crane.

Cranes with a telescopic boom have been developed to achieve relatively large lifting heights while being able to quickly retract the boom to transportable dimensions. Such telescopic booms usually have two or more sections with decreasing dimensions, the larger section enclosing the inserted part of the smaller section. The loads on the boom, such as the weight of the boom and the hook load, will result in a bending or overturning moment in the boom and therefore between the sections, which will result in large forces being transferred through guides between the telescoping sections, requiring significant material strength at the guides.

In general, a longer boom requires a heavier construction to be able to withstand not only the increased forces and bending moment induced by a hook load at a larger outreach of the crane, but also to support its own increased weight. When increasing the length of a conventional tubular type telescopic boom, such tubular boom may become too heavy for certain applications, such as off-shore applications, when taking into account the required material strength at the guides.

Application of a lattice type boom can reduce the weight of the boom significantly compared to a tubular type boom. A telescoping boom with lattice type sections is known, but extending said sections may be relatively time-consuming. Stable guiding of the telescopic boom sections, and load transfer between the sections, also appear to remain difficult. In the field of wind turbine installation, it is expected that the required lifting height for installing the turbine on top of the tower will increase to 140-160 m, or beyond, in the near future. For onshore installation of wind turbines, for which usually conventional mobile cranes with telescopic boom are used, this lifting height would require the largest available conventional mobile telescopic cranes with additional lattice jib and luffing systems.

For offshore installation of wind turbines, jack-up platforms carrying lattice boom type cranes with boom hoist wires are generally used. The expected lifting heights for future installations exceed the current capabilities of the available cranes on existing installation jack-up platforms. If a lattice boom of such a lattice boom type crane were extended with an additional section, the longer boom would then protrude from its original boom rest in a transit position and the crane block would not fit its original support. This could result in increased bending moment in the boom during transit. The protruding boom may not fit within the footprint of the jack-up platform any more and may extend outwardly thereof, which may cause stability problems during transit of the platform and/or may result in an increased bending moment in the boom. The protruding boom might potentially also come into contact with water in case of heavy weather during transit. Additionally, the protruding boom can also cause logistic problems on the platform itself, such as the boom blocking the helicopter platform.

A telescopic boom may partially solve the above-mentioned problems. However, the larger extendable lattice boom type cranes become, the more time is spent in upending and extending the crane, which time is lost for crane operations, resulting in an increase in costs.

It is an aim of the present invention to solve or alleviate one or more of the above-mentioned problems. Particularly, the invention aims at providing an improved extendable lattice type crane boom, which allows relatively swift positioning of the crane boom in a safe and stable way.

To this aim, according to a first aspect of the present invention, there is provided an extendable lattice type crane boom characterized by the features of claim 1. In particular, there is provided an extendable lattice type crane boom for a crane, the boom comprising a lattice type base boom section and at least one lattice type telescopic boom section. The at least one telescopic boom section is adjustable with respect to the base boom section between a retracted position, in which the telescopic boom section is substantially inside of the base boom section, and an extended position, in which the telescopic boom section is at least partly outside of the base boom section. A distal end of the base boom section may comprise a first collar to which a first guiding system is mounted, the guiding system being configured to guide a movement of the telescopic boom section along the base boom section. Said guiding system may for example include guide rails and guide elements configured to be guided along the guide rails. A proximal end of the telescopic boom section comprises a second guiding system configured to guide a movement of the telescopic boom section along the base boom section. In an inventive way, the base boom section comprises a third guiding system configured to guide a movement of the telescopic boom section along the base boom section, said third guiding system being spaced-apart from the first guiding section at a distance corresponding to a length of the telescopic boom section part remaining inside of the base boom section in the extended position of the telescopic boom section. The third guiding system can provide an increase in stability during extending and upending of the crane boom. During extending of the telescopic boom section from the retracted position to the extended position, the telescopic boom section can first be supported and guided by the first and the second guiding system, while the third guiding system hardly takes any load. Then the third guiding system can take over the guiding from the second system, such that the telescopic boom section can be supported by the first and the third guiding system, while the second guiding system takes no load anymore. Thanks to the third guiding system, the crane boom can be extended and upended in a relatively swift way while maintaining a relative stability throughout the operation. A guiding system may comprise guide rails and guide elements configured to be guided along the guide rails, wherein the guide rails are provided on one of the base boom section and the telescopic boom section and the guide elements are provided on the other one of the base boom section and the telescopic boom section. As such, the guide system comprises cooperating parts, namely a guide element and a guide rail, provided on the cooperating sections, namely the base boom section or the telescopic boom section, such that the guide element can be guided along the guide rails. For example, the first guiding system may comprise guide elements provided on the base boom section and guide rails provided on the telescopic boom section, wherein the guide elements of the first guiding system are mounted to the base boom section at the position of the first collar. The guide elements may be rollers, shoes or guides, or may be embodied otherwise. The position of the guide elements and the guide rails may be vice versa as well, in that the guide rails may be provided at the base boom section and the guide elements of the first guiding system may be provided at the telescopic boom section. Advantageously, a collar is provided to the section to which the guide elements are mounted. So, when the guide elements are mounted to the base boom section, the base boom section is provided with a first collar at least at the axial position where the guide elements are mounted. Also the second guiding system comprises guide elements on one of the base boom section and the telescopic boom section and cooperating guide rails on the other one of the base boom section and the telescopic boom section. Similarly, the third guiding system comprises guide elements on one of the base boom section and the telescopic boom section and cooperating guide rails on the other one of the base boom section and the telescopic boom section. The third guiding system is provided on the base boom section, at a distance of the first guiding system. Thus, the third guiding system on the base boom section may be provided with guide elements, that cooperate with corresponding guide rails on the telescopic boom section, or vice versa. Advantageously, a second collar can be provided at a position of the guide elements, to reinforce the section to which the guide elements are mounted. The first guiding system and the third guiding system are mounted to the same section of the telescopic crane: the base boom section or the telescopic boom section, advantageously to the base boom section. In an example, the second guiding system is mounted to the same one of the base boom section and the telescopic boom section than the one to which the first and the third guiding system are mounted. In another example, the second guiding system is mounted to the other one of the base boom section and the telescopic boom section than the one to which the first and the third guiding system are mounted.

The base boom section can preferably comprise a second collar to which the third guiding system is mounted. The second collar can reinforce the base boom section to transfer the load from the third guiding system to the base boom section.

The first guide system and/or the third guide system may comprise guide elements at all four chords of the respective base boom section or telescopic boom section to which the guide elements are mounted. The guide elements can be rollers, or x-y guides, or radial guides, or guiding shoes, etc. The guide elements of the first guiding system are mounted at the same axial position along the base boom section, or the telescopic boom section., The guide elements of the third guiding system are also mounted at the same axial position along the base boom section, or the telescopic boom section. By providing guide elements on all chords of the base boom at the first collar and at the second collar, a robust, stable and reliable connection between the base boom and the telescopic boom can be obtained. Such connection can facilitate a more easy extending and upending procedure as well, in which extending and upending may be done partly simultaneously. The second guiding system may comprise guide elements at the lower chords of the telescopic boom section only. Or, the second guiding system may comprise guide elements at the lower chords as well as the upper chords of the telescopic boom section, or vice versa of the base boom section.

A collar may be provided at the axial position where the guide elements of the first guiding system and/or of the third guiding system are mounted. The collar may comprise braces connection at least two chords at the axial position of the guide system. The collar may thus comprise two braces connecting two pairs of opposite braces. Alternatively, the collar may comprise four braces connecting the four chords at the axial position of the guide system. The collar may be provided for reinforcement of the, in an example, base boom section.

The second guiding system can advantageously include at least one rail mounted to at least one chord of the base boom section, wherein a length of said rail is substantially shorter than a length of the telescopic boom section part configured to extend from the base boom section in the extended position of the telescopic boom section. Said relatively short length of the rail can allow a transfer of the guiding of the telescopic boom section from the second guiding system to the third guiding system, for example, when the telescopic boom section is more or less halfway between the retracted position and the fully extended position.

It is preferred that the first guiding system is a x-y guide system. An x-y guide system can comprise a substantially simultaneous guiding along two substantially transverse directions, for example including a first guide roller configured to guide a movement of the telescopic boom section along the base boom section along a first direction x, and including a second guide roller configured to guide a movement of the telescopic boom section along the base boom section along a second direction y, which is substantially transverse to the first direction x. Both directions are preferably substantially transverse to a longitudinal axis of the crane boom.

It is preferred that the third guiding system is an x-y guide system, which can allow a relatively stable guiding of the telescopic boom section, especially in an extended position and/or at a relatively high boom angle, especially since an x-y guide system can prevent rotation around a longitudinal axis, which is not the case for a radial guide system.

More preferably, the first and/or the third guiding system can include at least one rail mounted to, or integrated into, at least one chord of the telescopic boom section, said rail being shaped such as to guide both an x-guide roller as well as an y-guide roller of a x-y guide system. The rail can for example have a substantially rectangular cross-section, such that two adjacent sides of the rail can guide both the x-guide roller along a first side of the rail as well as the y-guide roller along a second side which is adjacent to the first side.

The telescopic boom section can preferably include chords having a substantially rectangular cross-section. A rail, for example a guiding rail of the first guiding system or of the third guiding system, can be mounted relatively easily to such a substantially rectangular chord. Alternatively, the chords may have a substantially round cross-section.

The base boom section can preferably include chords having a substantially circular cross-section, which are relatively easy to manufacture.

Advantageously, the second guiding system may be a radial guiding system, provided on a chord of the base boom section and/or the telescopic boom section under an angle of substantially 450 with respect to an upper or a lower side of the boom. The radial guide system may for example include at least one, preferably two, guide rollers connected to a chord of a lower side of the telescopic boom section in a substantially horizontal position of the boom. The at least one radial guide roller is configured to be in rolling or sliding contact with a chord of a lower side of the base boom section under an angle of approximately 45°. The chord may be provided with a rail to guide the rolling or sliding contact of the guide roller on the chord. Other configurations of radial guide systems are possible as well.

A lower side of the extendable boom is a side which is turned downwards when the extendable boom is retracted and in a transport position. When the extendable boom, as part of a crane, is brought into a working position, which is a substantially upright but still slightly tilted position of the boom, said lower side is also the side on which loads can be hoisted.

The extendable lattice type crane boom may further comprise a locking system configured to lock the at least one telescopic boom section with respect to the boom section in at least the extended position, such that boom load can be transferred through the chords. Such a locking system can provide a solid locking of an extendable boom in at least an extended position, and may be relatively easy and quick in operation. The telescopic boom section can be locked with respect to the base boom section in at least an extended position. However, locking in the retracted position and/or in intermediate positions may also be possible. Alternative to locking of the telescopic boom section in the retracted position, there may be a stop element provided against which the telescopic boom section may abut as to position the telescopic boom section in the retracted position. To enable locking at these positions, the telescopic boom section may for example be provided with multiple apertures arranged for receiving a locking pin from the locking system. The apertures of the telescopic boom section are preferably provided at predetermined positions on the chords thereof, such that they can receive a locking pin in a required position of the telescopic boom section.

The locking system can preferably include a plurality of pins, each pin being configured to extend, in at least the extended position of the boom, at least partly through a corresponding pin receiving aperture provided in one of the first collar and the telescopic boom section, wherein a size of the pin receiving aperture is at least 10 mm larger than a cross-sectional dimension of the corresponding pin. The pin receiving aperture can have various forms, e.g. a substantially round hole, or a slotted hole, or an egg-shaped hole, or any other variant of a hole in which in at least one radial direction, the dimension of the hole is at least 10 mm, preferably 20 mm, more preferably at least 30 mm, larger than a cross-section of the corresponding pin as to provide sufficient play or clearance in the connection to ensure relatively easy insertion or disengagement of the pins. The additional dimension can be provided in one direction, e.g. resulting in a slotted hole or an oval hole or an egg-shaped hole, or can be provided in more than one radial direction with respect to the cross-section of the pin, or can be provided in all radial directions of the hole, resulting in an enlarged hole with respect to the cross-sectional dimension of the pin.

The locking system may comprise a support structure at a distal end of the base boom section, on which support structure locking pins may be mounted, extending from the support structure towards a chord of the telescopic boom section. The locking pins are positioned to align with pin receiving apertures in the chords of the telescopic boom section when the telescopic boom section is in the extended position. The telescopic boom section is preferably provided with pin receiving apertures arranged in or integrated within the chords and are configured to receive the locking pins. The locking pins can for example be engaged with hydraulic or electric actuating means. The locking pins are engageable in the retracted and/or extended and/or intermediate position of the telescopic boom section with respect to the base boom section. When the locking pins are engaged, the guides of the first and third guiding systems remain in contact with their respective guide rails. As such, the axial boom load may be directly transferred via the locking pins through the chords. Shear or side load transfer may go through the guides of the guiding system when the pins are engaged. When the locking pins are engaged, the telescopic system need not be actuated anymore, so axial load transfer is mainly done via these locking pins through the chords, instead of via the guides and/or via the telescopic system. Basically, the guides of the first and third guiding systems and/or the telescopic system may not be subject to axial boom loads in the extended position, but still be subject to side loads.

Alternatively, the support structure can be provided at the proximal end of the telescopic boom section with the locking pins connected thereto and extending therefrom towards a chord of the base boom section, or preceding telescopic boom section. Alternatively, the support structure can be provided at the distal end of the base boom section with the locking pins connected to the telescopic boom section, e.g. at the chords of the telescopic boom section, and extending therefrom towards the support structure.

The locking system may advantageously include as many pins as the telescopic boom section has chords, each chord being configured to receive only one pin. The base boom section, as well as the telescopic boom section, may for example have four chords. Then only four pins may be needed to safely lock the telescopic boom section with respect to the base boom section. Thanks to the third guiding system, there is no need anymore for additional locking pins to counteract bending load forces on the telescopic boom section, as may have been the case for prior art extendable booms.

The extendable lattice type crane boom may preferably further comprise a telescopic system arranged to adjust the at least one telescopic boom section between said retracted position and said extended position, wherein said telescopic system comprises at least one reeving system. The reeving system can comprise a wire rope tackle system with a winch. The wire rope can be reeved between sheaves mounted inside the base boom section and sheaves mounted on a telescopic boom section. Pulling the wire rope in with the winch can for example result in the telescopic boom section being pulled out of the base boom section, thus extending the boom, while moving along the guides. During retraction of a telescopic boom section, the winch can be operated to release the wire rope allowing the telescopic boom section to move inside of the base boom section, typically moving down as a result of gravity. In alternative embodiments, the telescopic system may comprise a hydraulic cylinder or a rack & pinion system, instead of a reeving system. The telescopic system can preferably comprise two reeving systems, each provided on an opposite side of the base boom section, preferably on lateral sides of the base boom section, which is advantageous for a balanced load distribution. Preferably there is a single winch for the two reeving systems such that the two reeving systems in fact form a single combined telescopic system provided at both sides of the base boom section.

The extendable lattice type crane boom may further comprise a measuring system configured to detect a position of the telescopic boom section with respect to the base boom section. Such measuring system can for example include a camera for visual inspection, or a closed circuit TV system, or any other suitable measuring system. The measuring system can send feedback of its measurements to a control system, which may control the extension or retraction of the extendable boom, in a partly or entirely automated way, or under control of a human operator.

Instead of a single telescopic boom section, the extendable crane boom may also comprise a plurality of telescopic boom sections with decreasing dimensions, preferably with decreasing cross-sectional dimensions, and/or with similar or decreasing longitudinal dimensions, each being movable relative to the other in order to extend or retract the boom. A similar guiding system between two contiguous telescopic boom sections may be used as between a telescopic boom section and a base boom section. Also the locking system and the telescopic system can be amended and/or multiplied to a plurality of telescopic boom sections.

According to another aspect of the invention, there is provided a crane having the features of claims 15-18. Such a crane can provide one or more of the above-mentioned advantages. The crane comprises an extendable lattice type crane boom as described above. Said lattice type boom is movable between a transit position, in which said lattice type boom is in a substantially retracted and substantially horizontal position, and a working position, in which the lattice type boom is extended. The crane also comprises a crane base to which said extendable lattice type boom is pivotably connected, such that the crane boom can be rotated around a substantially horizontal axis between said transit position and said working position. The crane base can optionally also be made rotatable around a substantially vertical axis. The crane further comprises a boom hoisting system arranged to rotate the extendable boom between said transit position and said working position, and a load hoisting system configured to hoist a load. The boom hoisting system can preferably be connected to a distal end of the base boom section as well as to a distal end of the telescopic boom section, which can provide a relatively stable, well-balanced and reliable crane. Alternatively, the boom hoisting system may also be connected to one of a distal end of the base boom section and a distal end of the telescopic boom section. The boom hoisting system may also be configured to be controlled by a control unit during operation of the telescopic system to follow the telescopic system to facilitate the movement of the telescopic boom section. Thus, the crane operator may only need to operate the telescopic system while the boom hoisting system follows automatically, controlled by a control unit, to facilitate movement of the telescopic boom section. As such, an optimal angle of about 80° of the crane boom can be kept during the telescopic operation.

Advantageously, a measurement system can be provided to determine the actual position of the telescopic crane boom section with respect to the base boom section. The measurement can provide feedback on the actual position to the crane operator who can adapt the crane operations on that information. Also, the measurement system can be configured to control a speed reduction of the telescopic system upon approaching a desired extended position. This may assist the crane operator in approaching the desired extended position and may reduce the risk on failures or damages.

The control unit for controlling the operation of the boom hoisting system in dependency of the operation of the telescopic reeving system can be part of the measurement system of may be provided as a separate control unit. In a preferred embodiment, a measurement system is provided that is configured to control the operations of the crane and provide output on measured parameters, such as telescopic boom speed to an output unit, e.g. the user interface of the crane operator.

The extendible crane boom can typically be provided with hoisting elements to which a hoisting system can be mounted that is connectable to a crane base, preferably to winches at the crane base. In a mounted position, when the boom is mounted to a crane base, one or more chords of the boom are upper chords at the side where the boom is provided with the hoisting elements. The chords at an opposite side thereof are, in mounted condition, the lower chords.

In a preferred embodiment of the crane, the crane base can be mountable around a leg of a jack up platform. Such a crane can provide a relatively compact yet efficient crane, even in a harsh off-shore environment. The crane base may also be mountable on a standard pedestal with a slewing bearing arrangement. However, providing the crane base around a leg of the jack-up platform provides for a space efficient solution for the use of the space on a deck of the jack-up platform.

According to a further aspect of the invention, there is provided a jack-up platform having the features of claims 18-19. Such a jack-up platform can provide one or more of the above-mentioned advantages.

According to still a further aspect of the invention, there is provided a method of operating a crane having the features of claims 20-23. Such a method can provide one or more of the above-mentioned advantages. In a preferred embodiment of the method, the operating of the telescopic system is started when the extendable lattice type boom has reached a boom angle of at least substantially 30 degrees, preferably at least substantially 50 degrees, more preferably at least substantially 55 degrees, with respect to a substantially horizontal position. The method can further comprise fixating a length of boom hoisting wires of the boom hoisting system. As a result of the fixating of a length of boom hoisting wires by the boom hoisting system, for example at a boom angle of substantially 50 degrees, or more or less, with respect to a substantially horizontal position, the operating of the telescopic system can result in an upending of the extendable boom, through the fixation of the length of boom hoisting wires of the boom hoisting system.

The present invention will be further elucidated with reference to figures of exemplary embodiments. Corresponding elements are designated with corresponding reference signs.

Figure 1:
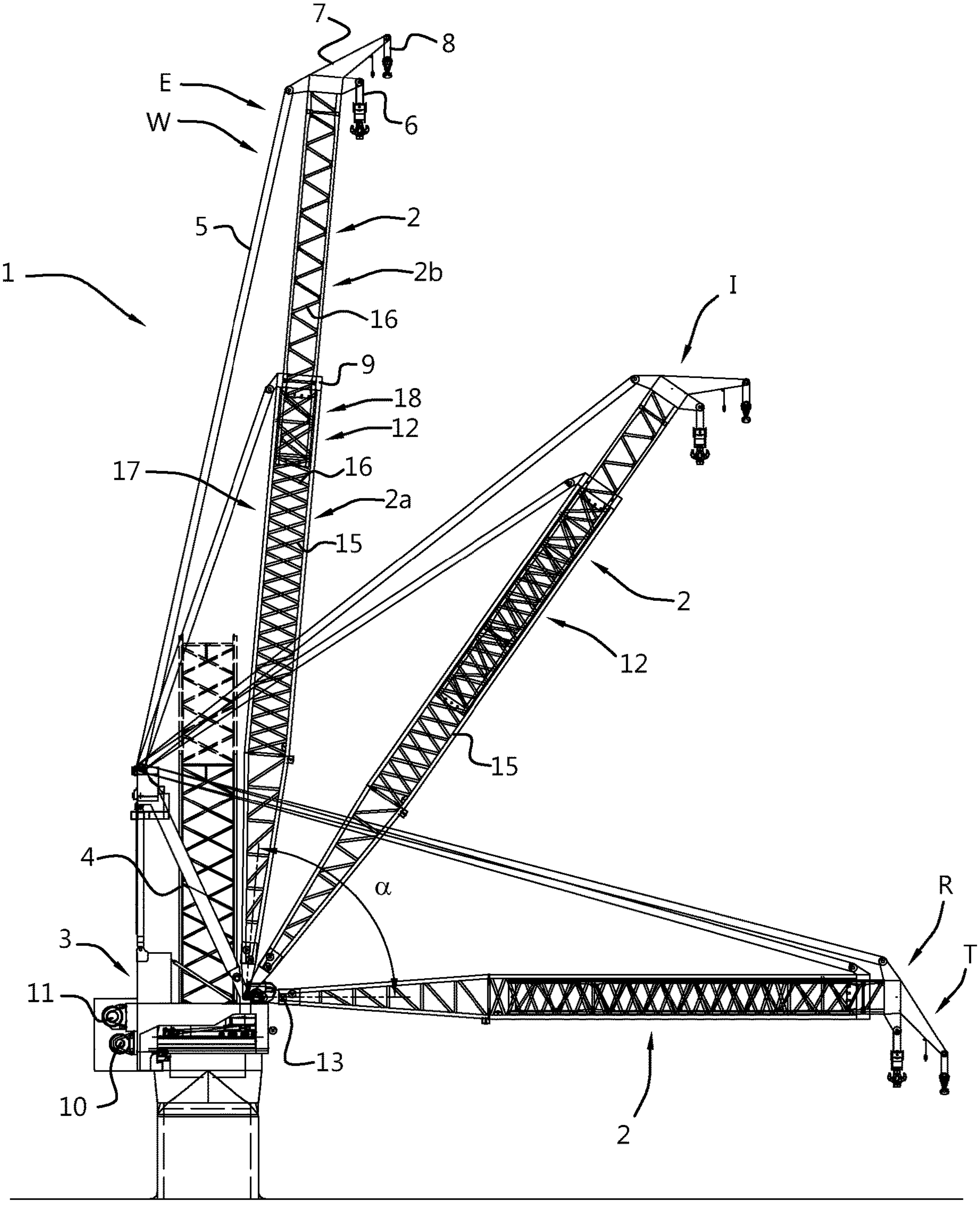
FIG. 1 shows a side view on a first embodiment of a crane including an extendable crane boom according to the invention in different positions.

FIG. 1 shows a side view on a first embodiment of a crane 1 including an extendable crane boom 2 according to the invention in different positions. The crane 1 comprises a crane base 3 to which said extendable lattice type boom 2 is rotatably connected. The crane base 3 may be mounted around a leg 4 of a jack up platform, for example as a slewing platform, but may also be mounted differently, for example on a standard pedestal with slewing bearing, on a jack up platform or on any other structure where this type of crane is needed. The lattice type boom 2 is movable between a transit position T, in which said lattice type boom 2 is in a substantially retracted and substantially horizontal position, and a working position W, in which the telescopic boom section 2*b* is in an extended position E, via an intermediate position I. To perform said movement of the crane boom, the crane 1 also includes a boom hoisting system 5 arranged to move the extendable boom 2 between said transit position and said working position. Said boom hoisting system includes at least one, preferably two, boom hoist winches 11 mounted on the crane base. The boom hoisting system 5 may include two parallel wire rope and sheaves systems both connected to a distal end of the extendable boom, and/or to a distal end of the base boom section 2*a*. The crane 1 is further equipped with a load hoisting system 6 configured to hoist a load. Said load hoisting system 6 may include at least one main hoist winch 10, a head assembly 7 mounted on a distal end of the extendable crane boom 2, as well as an optional secondary hoisting system 8 including an auxiliary hoist winch, which may be configured to hoist smaller loads, to a greater height and more quickly than the main load hoisting system. The main hoisting system may for example be configured to hoist loads of up to approximately 2500 tons to a height of approximately 115 m above ground/deck, or a load of up to approximately 1250 tons to a height of approximately 156 m above ground/deck. Such a configuration allows installation of off-shore wind turbines of up to approximately 16 MW. It is understood that this is just an example, and that smaller or larger configurations are possible. The extendable boom 2 comprises a lattice type base boom section 2*a* and at least one lattice type telescopic boom section 2*b*. The lattice type base boom section 2*a*, as well as the lattice type telescopic boom section 2*b*, each include longitudinal chords 15, in particular four chords 15, at each corner of the boom section 2*a*, 2*b*, which are interconnected with trusses 16. A diameter of the chords 15*a* of the base boom section 2*a* is typically larger than a diameter of the chords 15*b* of the telescopic boom section 2*b*. The telescopic boom section 2*b* is adjustable with respect to the base boom section 2*a* between a retracted position R, in which the telescopic boom section 2*b* is substantially inside of the base boom section 2*a*, and an extended position E, in which the telescopic boom section 2*b* is at least partly outside of the base boom section 2*a*. In the above-mentioned example of a hoisting system configured for hoisting loads up to 2500 tons, the total boom length may for example be around 95 m in a retracted position, whereas the total boom length in a most extended position may for example be as long as approximately 135 m, or longer or shorter. The boom hoisting system 5 is connected to a distal end of the base boom section 2*a* as well as to a distal end of the telescopic boom section 2*b*, more in particular, to the head assembly 7 on the telescopic boom section 2*b* and to a support structure 9 on a distal end of the base boom section 2*a*. In a working position W, as shown, when the process of extension of the telescopic boom section 2*b* has been completed, the crane boom 2 makes an angle α with a substantially horizontal transit position of the crane boom 2 in a range of approximately 75°-85°, preferably an angle of approximately 80°. Said position can be considered as a starting position for hoisting loads, for which boom angles can be adjusted again to lower boom angles if needed. The transit and working positions also allow to define an upper side 17 and a lower side 18 of the extendable boom 2, the lower side 18 being the side of the extendable boom 2 turned downwards in a transit position, and the upper side 17 of the extendable boom 2 being the opposite side of the lower side 18. The boom hoisting system 5 is at least partly mounted on the upper side 17 of the extendable boom 2, whereas loads are hoisted along the lower side 18 of the extendable boom 2. The extendable crane boom 2 also comprises a telescopic system 12 arranged to adjust the at least one telescopic boom section 2*b* between said retracted position and said extended position. Said telescopic system 12 comprises at least one reeving system, preferably two reeving systems, each provided on an opposite side of the base boom section 2*a*, preferably on lateral sides of the base boom section 2*a* (see FIG. 4). The telescopic system 12 can be configured to extend the extendable boom 2 from a retracted position (R) to an extended position (E) relatively swiftly. The telescopic system 12 also includes at least one telescopic winch 13. The reeving system may be configured such that pulling a wire rope 14 in with the winch 13 can for example result in the telescopic boom section 2*b* being pulled out of the base boom section 2*a* at least partly, thus extending the boom, while moving along a guiding system. During retraction of a telescopic boom section 2*b*, the winch 13 can be operated to release a wire rope allowing the telescopic boom section to move inside of the base boom section. In order to speed up operations, which may be important in an harsh off-shore environment, it is desirable to start extending the telescopic boom section 2*b* during upending of the extendable boom 2, i.e. during the movement of the extendable boom 2 from a transit position T to a working position W, or start retracting the telescopic boom section 2*b* into the base boom section 2*a* while the boom 2 is being moved from a working position W to a transit position T. With prior art extendable boom cranes, such a combined movement of extending of the telescopic boom section and upending of the boom could cause distortions and sagging, especially at lower boom angles. With the present invention, it has become possible to start extending the telescopic boom section even at relatively low boom angles thanks to the innovative combination of three guiding systems, as will be explained further below.

Figure 2:
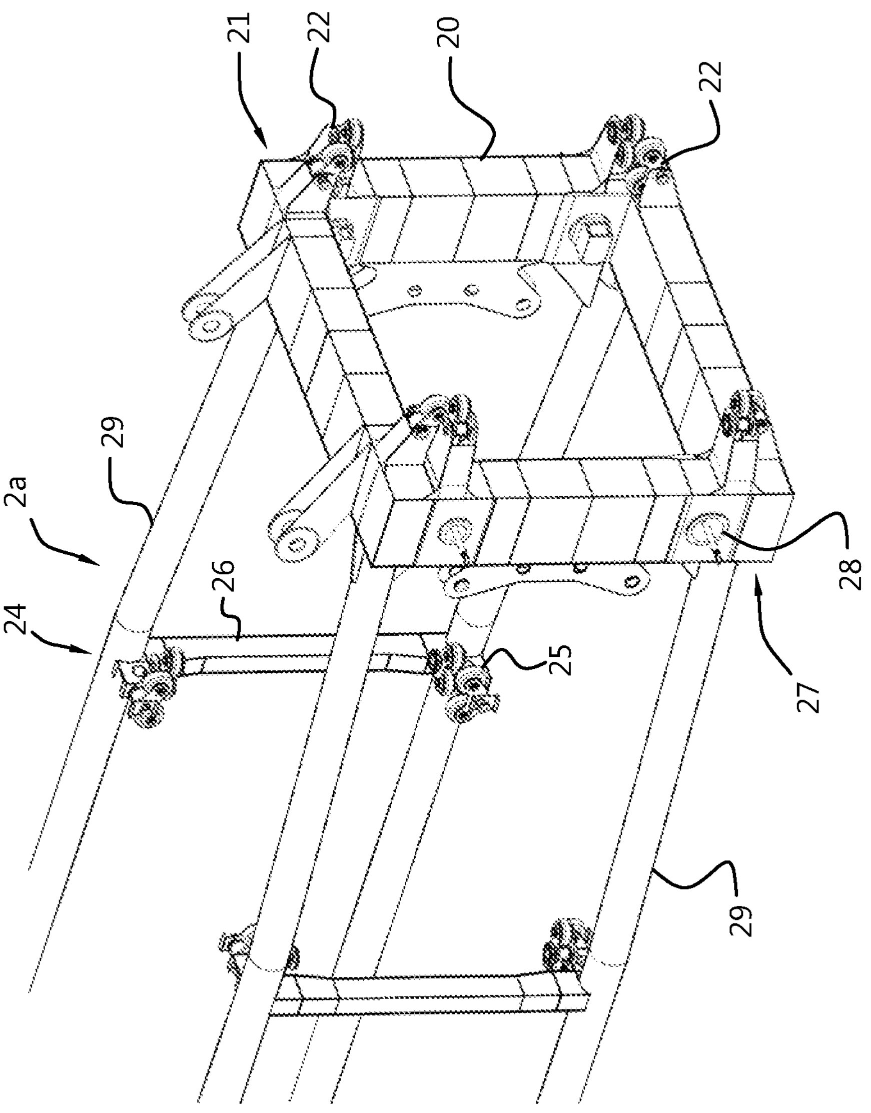
FIG. 2 shows a perspective view on a distal end of a base boom section of the extendable boom of the crane shown in FIG. 1.

FIG. 2 shows a perspective view on a distal end of a base boom section 2*a* of the extendable boom 2 of the crane 1 shown in FIG. 1. A distal end of the base boom section 2*a* comprises a first collar 20 to which a first guiding system 21 is mounted. The first collar 20 includes a cross-sectional reinforcement structure of the lattice-type boom section, such that the collar can take loads of the additional structures mounted to the collar, such as the first guiding system. The first guiding system 21 is configured to guide a movement of the telescopic boom section 2*b* along the base boom section 2*a*. Thereto, the first guiding system can comprise a set of guide elements 22 on the base boom section 2*a* and corresponding guide rails on the telescopic boom section 2*b*, or vice versa, (see FIG. 4). The guide elements 22 or guides 22, which can for example be embodied as rollers, are configured to perform a guiding movement, for example a rolling movement or a sliding movement, on or along corresponding guide rails on the telescopic boom section. The first guiding system 21 can for example include a set of guides 22 per chord. The corresponding rails of the first guiding system can be mounted on, or integrated into, each of the longitudinal chords of the telescopic boom section. The first guiding system can advantageously be an x-y guide system, in which each set of guides comprises at least two guides, for example rollers, which are configured to guide a movement of the telescopic boom section along two substantially transverse directions. In an innovative way, the base boom section 2*a* comprises a third guiding system 24 configured to guide a movement of the telescopic boom section 2*b* along the base boom section 2*a*. The third guiding system also includes a set of guide elements or guides 25 on the base boom section 2*a* and corresponding guide rails on the telescopic boom section 2*b*, or vice versa. Said third guiding system 24, in particular the set of guides 25 of the third guiding system, is spaced-apart from the first guiding system 21 at a distance corresponding to a length of the telescopic boom section part remaining inside of the base boom section 2*a* in the extended position of the telescopic boom section 2*b*. The base boom section 2*a* preferably comprises a second collar 26 to which the third guiding system 24, in particular the set of guides 25 of the third guiding system 24, is mounted. The second collar 26 can include one or more cross-sectional trusses, preferably as many cross-sectional trusses as a number of chords of the base boom section, for example four. Also the third guiding system 24 preferably is an x-y guide system. The first guiding system and the third guiding system are preferably of the same type. As such, both the first guiding system 21 as the third guiding system 24, in particular the guide elements of the respective first guiding system 21 and of the third guiding system 24 on the base boom section 2*a*, can share the same guide rails provided on the telescopic boom section 2*b*, as will be shown further on. The extendable crane boom can further comprise a locking system 27 configured to lock the at least one telescopic boom section 2*b* with respect to the base boom section 2*a* in at least the extended position. Thereto, the locking system 27 can include a plurality of pins, each pin being configured to extend, in at least the extended position of the boom, at least partly through a corresponding pin receiving aperture 28 provided in one of the first collar 20 and the telescopic boom section 2*b*. In case the plurality of pins extend from the first collar, then a size of the pin receiving aperture 28 in the telescopic boom section 2*b* may advantageously be at least 10 mm larger than a cross-sectional dimension of the corresponding pin, so that locking and unlocking of the pins can be done relatively easily without frictional forces hindering the pin movement in and/or out of the pin receiving aperture 28. Alternatively, the plurality of pins could also extend from the telescopic boom section, while the pin receiving apertures are present in the first collar. Also in that case, a size of these pin receiving apertures may be at least 10 mm larger than a cross-sectional dimension of the corresponding pin. The locking system can preferably include as many pins as the telescopic boom section has chords, each chord being configured to receive only one pin. As will be shown further, the telescopic boom section 2*b* of the present embodiment has four chords 29, so the first collar 28 includes four pin receiving apertures 28, which are each configured to receive a pin, which is configured to lock a position of the telescopic boom section 2*b* with respect to the base boom section 2*a*.

Figure 3:
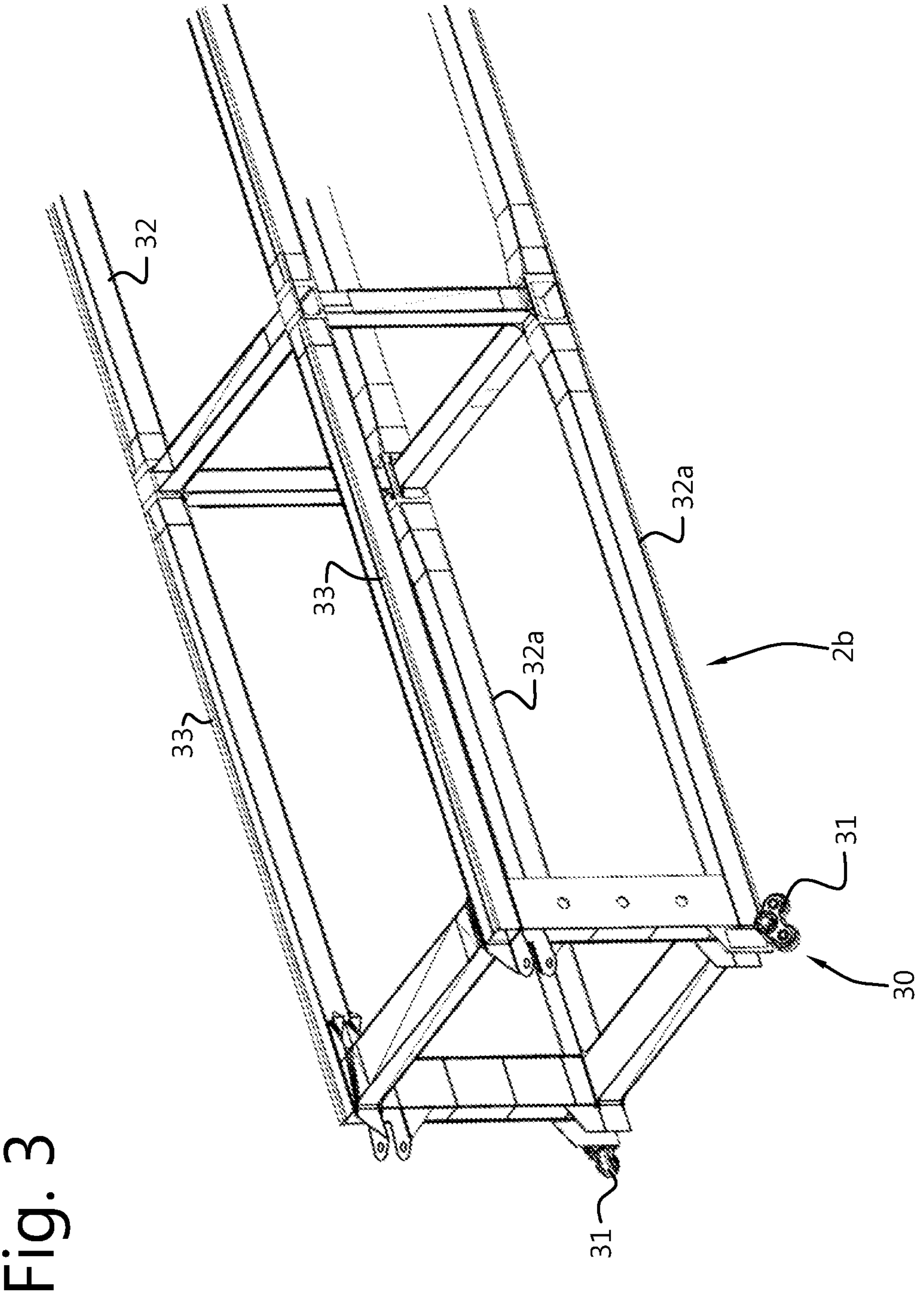
FIG. 3 shows a perspective view on a proximal end of a telescopic section of the extendable boom of the crane shown in FIG. 1.

FIG. 3 shows a perspective view on a proximal end of a telescopic section 2*b* of the extendable boom 2 of the crane 1 shown in FIG. 1. A proximal end of the telescopic boom section comprises a second guiding system 30 configured to guide a movement of the telescopic boom section 2*b* along the base boom section 2*a*. The second guide system also includes a set of guides and corresponding rails, wherein the guides are provided on the telescopic boom section 2*b* and the rails are provided base boom section 2*a* or vice versa. Contrary to the first and the third guiding system, the second guiding system can be a radial guiding system. In the present embodiment, a set of guides 31, in particular rollers, are provided on a chord 32, in particular on the lower chords 32*a* of the telescopic boom section 2*b* under an angle of substantially 45° with respect to an upper or a lower side of the boom. Guides may also, but need not, be provided on the upper chords of the telescopic boom section. A guide rail of the second guiding system 30 may be provided on part of a length of the chords of the base boom section 2*a*, which preferably has a substantially circular cross-section. The guide rails are mounted correspondingly under an angle of substantially 45° with respect to an upper or a lower side of the boom. Alternatively, guides and guide rails may be switched.

Figure 4:
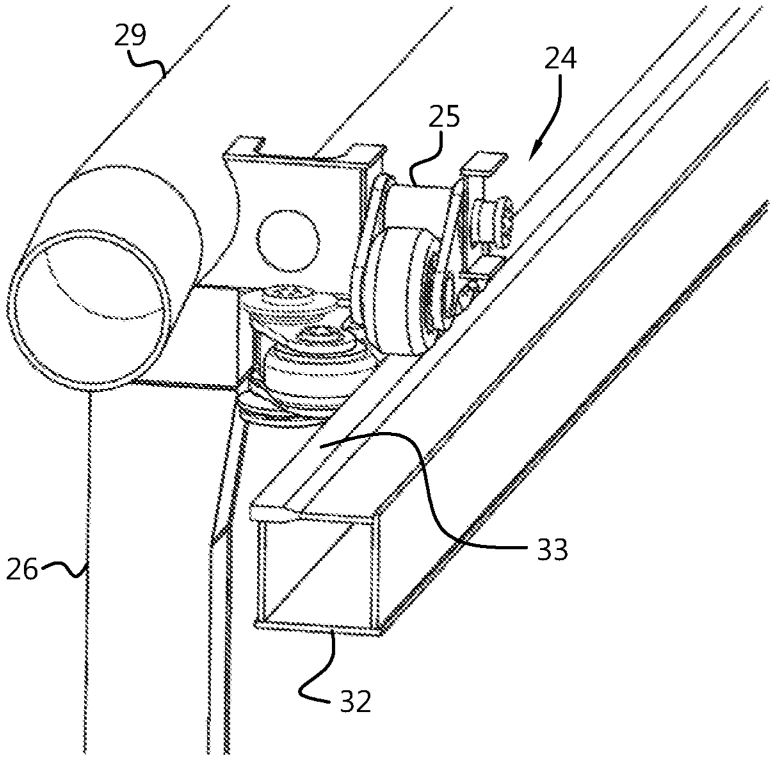
FIG. 4 shows a perspective detailed view on the third guiding system of the extendable boom of FIG. 1.

FIG. 4 shows a perspective detailed view on the third guiding system of the extendable boom of FIG. 1. Contrary to the base boom section, the telescopic boom section 2*b* preferably has chords having a substantially rectangular cross-section. A guide rail 33 of the first guiding system 21 and/or the third guiding system 24 can be mounted on, or can be integrated into, a chord 32 of the of the telescopic boom section 2*b*. Said rail 33 may be shaped such as to guide both an x-guide roller as well as an y-guide roller of a x-y guide system. In particular, said guide rail 33 may include two adjacent guiding sides which are substantially transverse to each other. Such a guide rail 33 may then be placed at an outer edge of a chord of the telescopic boom section 2*b* having a substantially rectangular cross-section. It is preferred that a guide rail 33 on a chord of the telescopic boom section 2*b* can engage both a corresponding guide of the first guiding system 21 and of the third guiding system 24.

Figure 5:
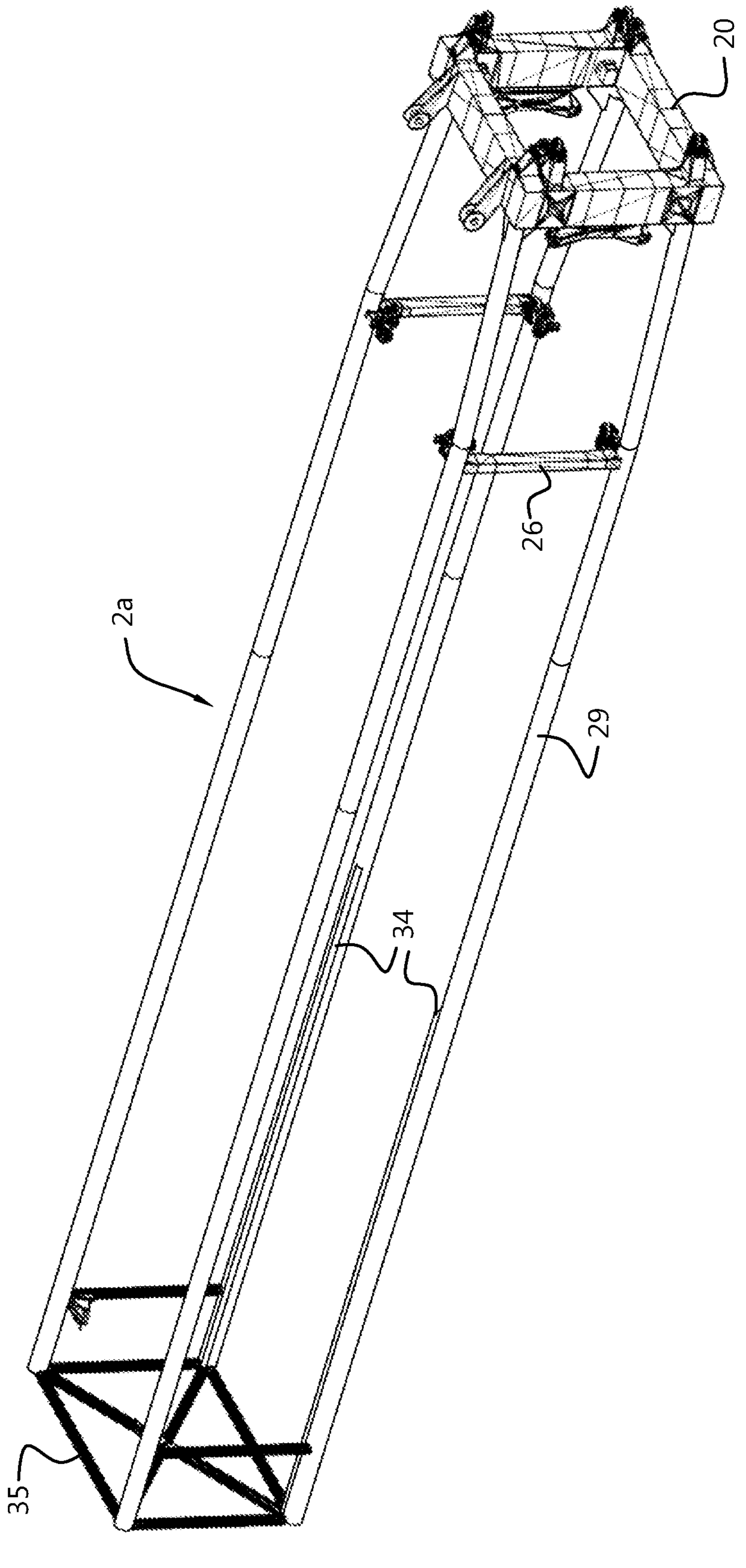
FIG. 5 shows a perspective view on a base boom section of the extendable boom of the crane shown in FIG. 1.

FIG. 5 shows a perspective view on a base boom section 2*a* of the extendable boom 2 of the crane 1 shown in FIG. 1. As in the previous figures, the lattice-type trusses between the longitudinal chords 29 have not been shown for clarity's sake. Also the second collar 26 may include two additional cross-sectional trusses or strengthening structures. As shown before, the base boom section 2*a* includes chords 29 having a substantially circular cross-section. The second guiding system 30 also includes at least one rail 34, preferably at least two rails 34, mounted to at least one chord 29 of the base boom section 2*a*, preferably to the lower chords 29*a* of the base boom section 2*a*. The guide rails 34 are preferably mounted under an angle of substantially 45° with respect to an upper or a lower side of the boom, such that they can engage the guides 31 of a radial guiding system. A length of said guide rail 34 can be substantially shorter than a length of the telescopic boom section part configured to extend from the base boom section 2*a* in the extended position E of the telescopic boom section 2*b*. The guide rail 34 can extend from a proximal end 35 of the base boom section 2*a* along the chords 29 of the base boom section 2*a*, for example over less than half of a length of the base boom section 2*a*.

Figure 6:
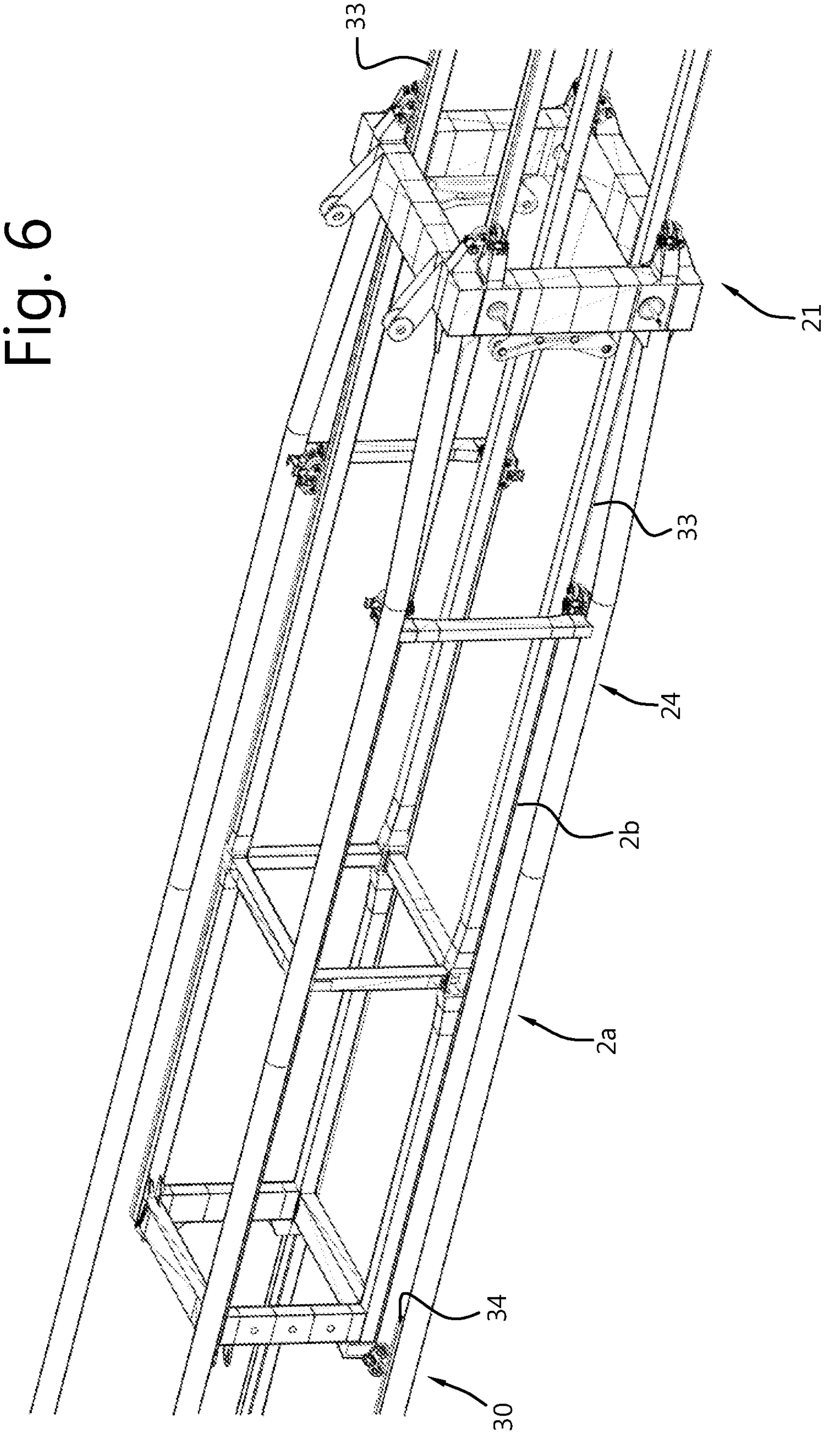
FIG. 6 shows a perspective view on a part of the extendable boom of FIG. 1 in a first intermediate position.

FIG. 6 shows a perspective view on a part of the extendable boom of FIG. 1 in a first intermediate position. When moving the extendable boom from a retracted position R (shown in FIG. 1) in which the telescopic boom section 2*b* is substantially inside of the base boom section 2_a_, to an extended position E, in which the telescopic boom section is at least partly outside of the base boom section, the telescopic boom section 2_b_ is first guided by the first guiding system 21 and by the second guiding system 30, as is shown in the intermediate position of FIG. 6. The guides 25 of the third guiding system 24 may engage the guide rail 33, but the third guiding system 24 hardly takes any load. In this phase of extending of the telescopic boom, the crane boom is statically undetermined.

Figure 7:
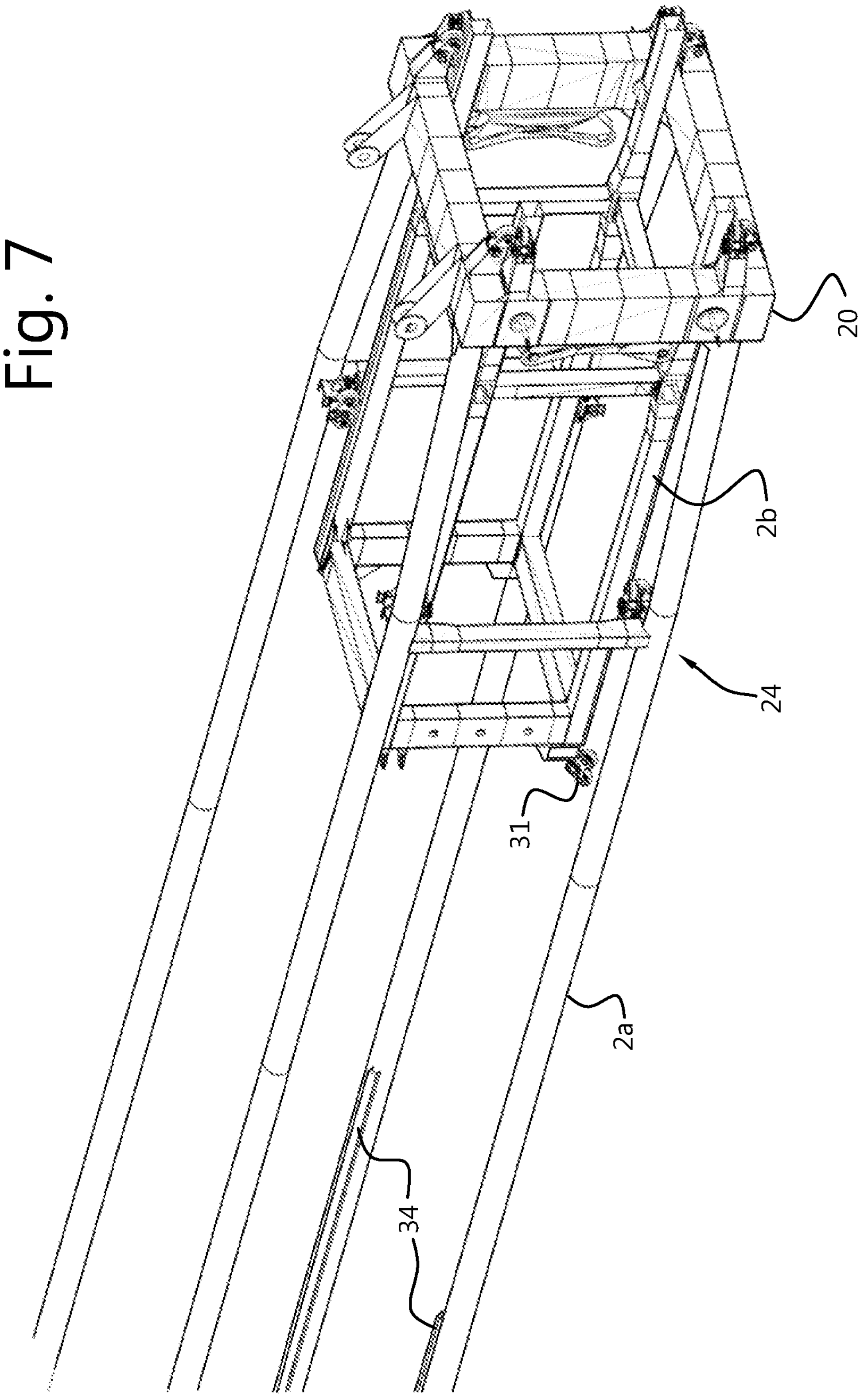
FIG. 7 shows a perspective view on a part of the extendable boom of FIG. 1 in a second intermediate position.

FIG. 7 shows a perspective view on a part of the extendable boom of FIG. 1 in a second intermediate position. When the telescopic boom section 2_b_ is extended further after the first intermediate position shown in FIG. 6, the guides 31 of the second guiding system 30 will at a certain point go beyond a length of the corresponding guide rail 34 of the second guiding system 30 so that the second guiding system stops guiding. The movement of the telescopic boom section 2_b_ is then guided by the first guiding system 21 and the third guiding system 24. The second guiding system 30 takes no load at all anymore. The telescopic boom section 2_b_ has reached its extended position E when the guides 31 of the second guiding system 30 have substantially reached the third guiding system 24 and/or the second collar 26. Extending the telescopic boom section 2_b_ out of the base boom section 2_a_ can be done when the extendable crane boom 2 is in a substantially upright position, in particular when the extendable crane boom 2 has a boom angle α of substantially 80 degrees with respect of a horizontal plane. However, the present invention also allows earlier extending of the telescopic crane boom, in particular starting extending from a boom angle α of substantially 30 degrees, or more preferably from a boom angle α of substantially 50 degrees. More in particular, thanks to the present invention, part of the upending of the crane boom from a transit position T to a working position W can be done by fixating a length of boom hoisting wires of the boom hoisting system 5, the length of boom hoisting wires being measured from the boom hoisting winches 11 to the crane boom. A boom hoisting system 5 can for example be activated to hoist a crane boom from a transit position T to a first intermediate position at a boom angle α in a range of more or less 30 to more or less 55 degrees with respect to a horizontal plane. Then the boom hoisting system 5 can be configured to keep hoisting wires at a constant length, for example by putting a brake on the boom hoist winches 11. Then the locking pins of the locking system 27 can be taken out of the pin receiving apertures 28, which locking system 27 had kept the telescopic boom 2 in a retracted position R. Next, the telescopic system 12 can be activated and extending of the telescopic boom can start. The start of the extending of the telescopic boom, in combination with the boom hoisting system being configured to keep hoisting wire ropes at a constant length, will make the upending of the crane boom continue towards the working position of the crane boom. So by at least partly performing extending of the telescopic boom during upending of the crane boom, or even better, by at least partly performing upending of the crane boom through extending the telescopic boom, time can be saved in making the crane ready for hoisting operations, while keeping these upending and extending operations relatively stable and thus safe thanks to the improved extendable crane boom.

For the purpose of clarity and a concise description, features are described herein as part of the same or separate embodiments, however, it will be appreciated that the scope of the invention may include embodiments having combinations of all or some of the features described. It may be understood that the embodiments shown have the same or similar components, apart from where they are described as being different.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage. Many variants will be apparent to the person skilled in the art. All variants are understood to be comprised within the scope of the invention defined in the following claims.

The invention claimed is:

1. An extendable lattice type crane boom for a crane, the boom comprising a lattice type base boom section and at least one lattice type telescopic boom section, wherein the at least one telescopic boom section is adjustable with respect to the base boom section between a retracted position, in which the telescopic boom section is substantially inside of the base boom section, and an extended position, in which the telescopic boom section is at least partly outside of the base boom section, wherein a distal end of the base boom section comprises a first guiding system, the guiding system being configured to guide a movement of the telescopic boom section along the base boom section;

wherein a proximal end of the telescopic boom section comprises a second guiding system configured to guide a movement of the telescopic boom section along the base boom section;

wherein the base boom section comprises a third guiding system configured to guide a movement of the telescopic boom section along the base boom section, said third guiding system being spaced-apart from the first guiding system at a distance corresponding to a length of the telescopic boom section part remaining inside of the base boom section in the extended position of the telescopic boom section;

wherein the first guiding system comprises a first guide rail and a cooperating first guide element configured to be guided along the first guide rail, said first guide rail being provided on one of the base boom section and the telescopic boom section, and said first guide element being provided on the other of the base boom section and the telescopic boom section;

wherein the second guiding system comprises a second guide rail and a cooperating second guide element configured to be guided along the second guide rail, said second guide rail being provided on one of the base boom section and the telescopic boom section, and said second guide element being provided on the other of the base boom section and the telescopic boom section; and wherein the third guiding system comprises a third guide rail and a cooperating third guide element configured to be guided along the third guide rail, said third guide rail being provided on one of the base boom section and the telescopic boom section, and said third guide element being provided on the other of the base boom section and the telescopic boom section.

2. The extendable lattice type crane boom according to claim 1, wherein the base boom section comprises a first collar to which the first guiding system is mounted and/or wherein the base boom section comprises a second collar to which the third guiding system is mounted.

3. The extendable lattice type crane boom according to claim 1, wherein the second guide rail is mounted to at least one chord of the base boom section, wherein a length of said second guide rail is substantially shorter than a length of the telescopic boom section part configured to extend from the base boom section in the extended position of the telescopic boom section.

4. The extendable lattice type crane boom according to claim 1, wherein first guide elements of the first guiding system and/or third guide elements of the third guiding system are mounted on chords of the base boom section, wherein the first guide elements and/or of the third guide elements are provided at the same axial distance along the base boom section.

5. The extendable lattice type crane boom according to claim 1, wherein the first guiding system is an x-y guide system.

6. The extendable lattice type crane boom according to claim 5, wherein the x-y guide system comprises an x-guide roller and a y-guide roller, wherein the first guide rail is mounted to or integrated into at least one chord of the telescopic boom section, said first guide rail being shaped to guide both the x-guide roller as well as the y-guide roller of the x-y guide system.

7. The extendable lattice type crane boom according to claim 1, wherein the third guiding system is an x-y guide system.

8. The extendable lattice type crane boom according to claim 7, wherein the x-y guide system comprises an x-guide roller and a y-guide roller, wherein the third guiding system includes at least one rail mounted to or integrated into at least one chord of the telescopic boom section, said at least one rail being shaped to guide both the x-guide roller as well as the y-guide roller of the x-y guide system.

9. The extendable lattice type crane boom according to claim 1, wherein the second guiding system is a radial guiding system, provided on a chord of the base boom section and/or the telescopic boom section under an angle of substantially 45° with respect to an upper or a lower side of the boom.

10. The extendable lattice type crane boom according to claim 1, further comprising a locking system configured to lock the at least one telescopic boom section with respect to the boom section in at least the extended position.

11. The extendable lattice type crane boom according to claim 10, wherein the locking system includes a plurality of pins, each pin being configured to extend, in at least the extended position of the boom, at least partly through a corresponding pin receiving aperture provided in a first collar of the base boom section or in the telescopic boom section, wherein a size of the pin receiving aperture is at least 10 mm larger than a cross-sectional dimension of the corresponding pin.

12. The extendable lattice type crane boom according to claim 11, wherein the locking system includes as many pins as the telescopic boom section has chords, each chord being configured to receive only one pin.

13. The extendable lattice type crane boom according to claim 1, further comprising a telescopic system arranged to adjust the at least one telescopic boom section between said retracted position and said extended position, wherein said telescopic system comprises at least one reeving system.

14. A crane comprising:

an extendable lattice type crane boom according to claim 1; wherein said lattice type crane boom is movable between a transit position, in which said lattice type crane boom is in a substantially retracted and substantially horizontal position, and a working position, in which a load is hoistable;

a crane base to which said extendable lattice type crane boom is pivotably connected;

a boom hoisting system arranged to move the extendable crane boom between said transit position and said working position;

a load hoisting system configured to hoist a load.

15. The crane according to claim 14, wherein the boom hoisting system is connected to a distal end of the base boom section as well as to a distal end of the telescopic boom section.

16. The crane according to claim 14, wherein the crane base is mountable around a leg of a jack up platform.

17. A jack up platform including a crane according to claim 14.

18. A jack up platform according to claim 17, wherein the crane base is mounted around a leg of the jack up platform.

19. A method of operating a crane including the extendable lattice type crane boom according to claim 1, the method comprising the steps of:

bringing the extendable lattice type boom from a transit position to a working position;

operating a telescopic system to adjust the at least one telescopic boom section with respect to the base boom section from a retracted position, in which the telescopic boom section is substantially inside of the base boom section, to an extended position, in which the telescopic boom section is substantially outside of the base boom section;

wherein the operating of the telescopic system and the operation of bringing the extendable lattice type boom from a transit position to a working position is done at least partly simultaneously.

20. The method according to claim 19, wherein the operating of the telescopic system is started when the extendable lattice type boom has reached a boom angle of at least 30 degrees, with respect to a horizontal position.

21. The method according to claim 19, wherein a length of boom hoisting wires of the boom hoisting system is fixated when the extendable lattice type boom has reached a boom angle of at least 30 degrees, with respect to a horizontal position.

22. The method according to claim 19, further comprising the step of locking the telescopic boom section with respect to the base boom section in the extended position of the telescopic boom section by inserting substantially simultaneously a plurality of pins through corresponding pin receiving apertures provided in chords of one of the telescopic boom section and the base boom section.

23. The extendible lattice type crane boom according to claim 1, wherein the first guide rail is mounted to, or integrated into, at least one chord of the base boom section or the telescopic boom section.

24. The extendible lattice type crane boom according to claim 1, wherein the second guide rail is mounted to, or integrated into, at least one chord of the base boom section or the telescopic boom section.

25. The extendible lattice type crane boom according to claim 1, wherein the third guide rail is mounted to, or integrated into, at least one chord of the base boom section or the telescopic boom section.

* * * * *